US008170565B2

(12) United States Patent
Zhu et al.

(10) Patent No.: US 8,170,565 B2
(45) Date of Patent: May 1, 2012

(54) METHOD AND APPARATUS OF DOMAIN SELECTION FOR ROUTING CONTROL

(75) Inventors: Dongming Zhu, Shenzhen (CN); Hai Zhang, Shenzhen (CN); Xiaoqin Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1140 days.

(21) Appl. No.: 11/965,834

(22) Filed: Dec. 28, 2007

(65) Prior Publication Data

US 2008/0102844 A1 May 1, 2008

Related U.S. Application Data

(63) Continuation of application No. PCT/CN2006/001673, filed on Jul. 14, 2006.

(30) Foreign Application Priority Data

Aug. 4, 2005 (CN) .......................... 2005 1 0028494

(51) Int. Cl.
*H04W 40/00* (2009.01)
(52) U.S. Cl. ......... 455/445; 455/324; 455/403; 370/352
(58) Field of Classification Search .................. 455/445; 370/216, 238, 351, 560
See application file for complete search history.

(56) References Cited

U.S. PATENT DOCUMENTS

| 6,823,395 B1 | 11/2004 | Adolfsson ...................... 709/242 |
| 6,993,593 B2 | 1/2006 | Iwata ............................ 709/238 |
| 2002/0196775 A1* | 12/2002 | Tuohino et al. ............... 370/352 |
| 2004/0025013 A1 | 2/2004 | Parker et al. |
| 2004/0208175 A1 | 10/2004 | McCabe ........................ 370/389 |
| 2007/0147395 A1 | 6/2007 | Chen et al. |

FOREIGN PATENT DOCUMENTS

| CN | 1349330 | 5/2002 |
| CN | 1400774 A | 3/2003 |

(Continued)

OTHER PUBLICATIONS

International Preliminary Report on Patentability for International Application No. PCT/CN2006/001673, dated Feb. 5, 2008.

(Continued)

*Primary Examiner* — Kamran Afshar
*Assistant Examiner* — Sayed T Zewari
(74) *Attorney, Agent, or Firm* — Huawei Technologies Co., Ltd.

(57) ABSTRACT

A method of domain selection for routing control, applied to a communication system including a Circuit Switched (CS) network and an IP Multimedia Subsystem (IMS) includes: obtaining call status(es) of a user in any one or both of the CS network and the IMS; selecting a domain via which an incoming call is to be delivered according to the call status(es) upon receiving a routing decision query request from a routing decision query entity, and indicating the routing decision query entity to deliver the incoming call via the CS network or the IMS selected. The method provided by embodiments of the present invention selects the domain according to the call status(es) of the user in any one or both of the CS network and the IMS. Therefore, the problem that two calls are respectively delivered via the CS network and the IMS at the same time may be avoided.

19 Claims, 7 Drawing Sheets

FOREIGN PATENT DOCUMENTS

| | | |
|---|---|---|
| CN | 1477821 A | 2/2004 |
| CN | 1514599 A | 7/2004 |
| CN | 1630268 A | 6/2005 |
| WO | 0051290 A2 | 8/2000 |

OTHER PUBLICATIONS

International Search Report for International Application No. PCT/CN2006/001673, dated Nov. 9, 2006.

Written Opinion for International Application No. PCT/CN2006/001673, dated Nov. 9, 2006.

3GPP TS 23.090 V6.0.0: 3rd Generation Partnership Project;Technical Specification Group Core Network; Unstructured Supplementary Service Data (USSD); Stage 2(Release 6),dated Dec. 2004. total 32 pages.

3GPP TR 23.806 V1.2.0:3rd Generation Partnership Project;Technical Specification Group Services and System Aspects;Voice Call Continuity between CS and IMS Study (Release 7),dated Jul. 2005; total 116 pages.

A. B. Roach:Session Initiation Protocol (SIP)-Specific Event Notification, dated Jun. 2002; total 29 pages.

A. Niemi, Ed.:Session Initiation Protocol (SIP) Extension for Event State Publication, dated Oct. 2004. total 24 pages.

Written opinion issued in corresponding PCT application No. PCT/CN2006/001673, dated Sep. 11, 2006; total 3 pages.

Basic et al., "Routing Solution for VoIP Calls in Large-scale IP MM Networks," *IEEE MELECON*, pp. 12-15 (2004).

Supplementary European Search Report for Application No. EP06753141, dated Jul. 15, 2008.

Office Action of corresponding European Patent Application No. EP06753141.8, mailed on Aug. 24, 2011, 6 pages total.

Office action issued in corresponding European patent application No. EP06753141.8, dated Nov. 16, 2011, total 6 pages.

\* cited by examiner

METHOD AND APPARATUS OF DOMAIN SELECTION FOR ROUTING CONTROL

CROSS-REFERENCE TO RELATED APPLICATIONS

This is a continuation of International Application No. PCT/CN2006/001673, filed Jul. 14, 2006, which claims the benefit of Chinese Patent Application No. 200510028494.5, filed Aug. 4, 2005, the entire disclosures of which are incorporated herein by reference.

FIELD OF THE INVENTION

The present invention relates to routing control technologies, and more particularly, to a method and an apparatus of domain selection for routing control in communication systems.

BACKGROUND OF THE INVENTION

Along with the rapid development of communication technologies, expectations and requirements upon personal communications grow increasingly. Mobile network operators are required to pay special attention to factors such as user interface, quality of service, etc., which may directly impact user's experience on mobile services. Although 3rd Generation (3G) mobile communication system greatly attracts consumers with its broad bandwidth, varieties of services and high quality, there are still problems in 3G technologies restricting development of the mobile services. For example, how to fully utilize existing network resources after new network technologies are continually introduced, how to provide better service experience for users by combining the features and capabilities of different network technologies, etc. These unsettled problems restrict enlargement of market to some extent.

In a 3G network architecture defined by current standards, the mobile network is no longer limited to a Circuit Switched (CS) network, but gradually evolves into a Packet Switched (PS) network. From 3rd Generation Partnership Project (3GPP) Release 5, a core network of Universal Mobile Telecommunications System (UMTS) has been divided into three sub-systems, i.e., a CS domain, a PS domain and an IP Multimedia Subsystem (IMS).

The CS domain provides connections for CS services, and mainly includes the following functional entities: Mobile Switching Center (MSC), Gateway Mobile Switching Center (GMSC) and Inter-Working Function (IWF). The MSC provides switching and signaling control functions for the CS services. In an architecture with separated service control and bearer control, the MSC may include an MSC Server and a CS Media Gateway (CS-MGW). The GMSC provides routing and addressing functions for a mobile user in a network and may be co-located with the MSC or separated with the MSC. The IWF is closely related to the MSC and is used for interworking between a Public Land Mobile Network (PLMN) and an Integrated Service Digital Network (ISDN), or between the PLMN and a Public Switch Telecommunication Network (PSTN), or between the PLMN and a Public Data Network (PLMN). The primary function of the IWF is signaling conversion. The detailed function of the IWF may vary with different services and network types.

The PS domain provides connections for PS services, and mainly includes a General Packet Radio Service Support Node (GSN) used for packet transmission for PS service users. The GSN further includes a Serving GSN (SGSN) and a Gateway GSN (GGSN). The SGSN connects the core network and a Base Station Subsystem (BSS) or a Radio Network Controller (RNC), performs mobility management and session management of the PS services, and manages the mobility and communication services of a Mobile Station (MS) in the mobile network. The GGSN is an interface between the mobile communication network and another PDN. Meanwhile, the GGSN has a function of querying location information. Both the SGSN and the GGSN are able to provide charging information. In addition, a Boarder Gateway (BG) is configured at the edge of a GPRS network to interwork between two GPRS networks and ensure the security of the interworking.

Additionally, some functional entities are shared by the CS and PS domains, e.g. Home Location Register (HLR)/Authentication Center (AuC). The HLR manages subscription data and location information of the user, e.g., Mobile Station ISDN number (MSISDN), International Mobile User Identity (IMSI), subscribed Telephony services and supplementary services and application scopes of these services, MSC/VLR number, SGSN number, etc. The AuC stores authentication algorithms and security keys for users. Other functional entities include Visitor Location Register (VLR) which stores data of visited users, Equipment Identity Register (EIR) which stores International Mobile Equipment Identities (IMEI), Short Message Service (SMS) center gateway MSC, etc.

The IMS is a subsystem superposed on the existing PS domain in the Wideband Code Division Multiple Access (WCDMA) network in 3GPP R5. The IMS employs the PS domain as the bearer channel for the transmission of upper layer control signaling and media data, adopts Session Initial Protocol (SIP) as service control protocol, and provides abundant of multimedia services for users by separating the service control and the bearer control, and by utilizing the characteristics of the SIP, i.e., simple, extensible and convenient for media combination. The functional entities in the IMS mainly include: Call Session Control Function (CSCF), Application Server (AS), Home Subscriber Server (HSS), and Media Gateway Control Function/IMS Media Gateway (MGCF/IM-MGW). The CSCF is used for controlling user registration and session control. The AS is used for providing varieties of service logic control. The HSS is used for centralized administration of user's subscription data. And the MGCF/IM-MGW is used for interworking between the IMS and the CS network. The user accesses the IMS through a proxy node, Proxy-CSCF (P-CSCF), in an area where the user currently locates. A home domain service node in the area where the user registers, Serving-CSCF (S-CSCF), performs the session control, service triggering and the interaction with the AS. An Interrogating CSCF (I-CSCF) performs entrance query and topology hiding of the IMS. The HSS in the IMS is a superset of the HLR and functionally compatible with the HLR. In practical applications, the HSS and the HLR in the CS/PS domain are very likely to be two independent entities.

The IMS defined by the 3GPP standards solves critical problems concerning operability of multimedia services over IP, including roaming charging, Quality of Service (QoS), security, etc. The architecture and basic ideas of the IMS have been widely admitted in the industry. Both 3GPP2, which drafts the technical standards for cdma2000 system, and the TISPAN, which drafts the technical standards for the next generation of fixed network, define corresponding IP multimedia network architectures and service systems based on the IMS defined by the 3GPP, i.e., the IP multimedia systems defined by different organizations have the same architecture.

Meanwhile, the 3GPP has begun to study the Interworking of WLAN access with 3GPP system (I-WLAN), Fixed Broadband IMS access (FBI) and the all-IP network which supports multiple access technologies (AIPN). The user is able to access, based on his/her subscription, to the IMS via access networks of different access technologies with a single multi-mode terminal or different types of terminals so as to receive unified multimedia services including VoIP. Furthermore, in the 3GPP R7, a work item is approved to study the solution of Voice Call Continuity (VCC) between Circuit Switched (CS) and IP Multimedia Subsystem (IMS), within the work item, a requirement of routing selection between the CS domain and the IMS is raised when receiving an incoming call destined to a user to meet the demands of network and service developments.

In a new application environment with multiple available domains, in order to enrich the variety and diversity of services for the user and improve the mobile service market for the operators, the network is required to have an ability of selecting a domain via which a voice call is to be delivered. For example, deliver the voice call as the CS voice service via the GSM, WCDMA CS domain, cdma2000 CS domain or the PSTN, or deliver the voice call as the VoIP service via the IMS accessed via various fixed/mobile IPCAN. Then a new requirement of domain selection is brought out, i.e., when all incoming call destined to a user is received, how to select different domain to deliver the incoming call according to routing policy and other conditions. The settlement of the domain selection directly affects whether the user is able to register in multiple domains simultaneously and enjoy multi-domain voice service flexibly.

Because the requirement is originally raised in the 3GPP, the CS/IMS of the WCDMA system is mainly taken as an example hereinafter. But according to the foregoing descriptions, it can be seen that the requirement of domain selection also exists between CS voice services provided in the GSM, cdma 2000 CS domain and the PSTN and VoIP services provided in the IMS accessed via various fixed/mobile IPCAN.

To realize the domain selection in the CS/IMS, a Routing Policy Decision Point (RPDP) is introduced in the related art. During the domain selection procedure, the RPDP is queried for a routing decision. The RPDP makes the routing decision according to current routing policy pre-configured and stored in the PDCP and routing-decision-making related information of the user in the CS/IMS, determines routing information according to the routing decision, and returns routing information determined to a routing control entity in the CS/IMS which performs subsequent routing control for the incoming call according to the routing information.

The technical solution in the related art may have two implementation modes based on the type of an interface adopted for the query of the routing decision, i.e., a first mode adopting a call-control protocol based interface and a second mode adopting a non-call-control protocol based interface.

In the first mode, the routing control entity in the CS/IMS queries the RPDP for the routing decision through the call-control protocol based interface. For example, the GMSC in the GSM or in the WCDMA CS domain interacts with the RPDP functioning as a GSM Service Control Function (gsm-SCF) through a Customized Application for Mobile network Enhanced Logic (CAMEL) Application Part (CAP) interface; or the GMSC in the cdma2000 CS domain interacts with the RPDP functioning as a Wireless intelligent Network (WIN) Service Control Function (SCF) through an American National Standards Institute-41 Mobile Application Protocol (ANSI-41 MAP); or a local exchanger in the PSTN interacts with the RPDP functioning as a fixed Intelligent Network (IN) SCF through an Intelligent Network Application Protocol (INAP); or the S-CSCF in the IMS interacts with the RPDP functioning as an AS through an IMS Service Control interface (ISC). Thus, the query of the routing decision and the routing control according to the routing decision may be implemented.

In the second mode, the routing control entity in the CS/IMS queries the RPDP for the routing decision through the non-call-control protocol based interface. For example, the RPDP which functions as a Signaling Transfer Point (STP) intercepts a routing information query message from the GMSC to the HLR in the GSM, WCDMA CS domain or cdma2000 CS domain; or the HLR in the GSM, WCDMA CS domain or cdma2000 CS domain queries, upon the receipt of the routing information query message from the GMSC, the RPDP through a new interface; or the HSS in the IMS queries, upon the receipt of the routing information query message from the I-CSCF, the RPDP through another new interface, so as to implement the query of the routing decision and the routing control according to the routing decision.

However, in the above two modes, the routing-decision-making related information of the user in the CS/IMS for making the routing decision is always obtained by interacting with the HLR/HSS. For example, the RPDP queries, the HLR/HSS for the routing-decision-making related information when making the routing decision, or locally stores the routing-decision-making related information and the HLR/HSS updates the routing-decision-making related information stored in the RPDP when the routing-decision-making related information changes. The HLR/HSS has no knowledge about which domain is used by an existing call. In other words, the HLR/HSS has no knowledge of call status(es) of the user in any one or both of the CS domain and the IMS. Therefore, the existing solution does not consider the call status(es) of the user in any one or both of the CS domain and the IMS. In other words, under the scenario that the user may register in both the CS domain and the IMS, the existing solution does not consider how to select the domain to deliver an incoming call to avoid the problem that two calls are delivered via two domains while the user can only accept one of the calls.

In practical applications, a UE usually has one audio I/O channel (voice channel) and the user usually can only answer one call at one time. Even when the UE is capable of accessing both the CS domain and the IMS at the same time and establishing calls in the CS domain and the IMS, it is impossible to engage in two voice calls respectively in the CS domain and the IMS at the same time. Therefore when routing an incoming call, it is necessary to avoid an abnormal condition that two calls are delivered to the user via the CS domain and the IMS respectively while the user can only answer one of them.

In the related art, there are services capable of handling multiple calls or a subsequent call in one domain. For example, in the CS domain, several supplementary services are defined to handle the subsequent call during an existing call, including call waiting, call holding, multi-party service, call forwarding on subscriber busy, etc. Thus, an incoming call may be handled when there exist an existing call. In the IMS, although no such service is defined in detail as in the CS domain, there are similar services to handle the subsequent call.

Therefore, in the case that the two domains are capable of providing voice services to the user at the same time, it is necessary to avoid the problem that a call is delivered to the user via a domain other than the domain in which the user has an existing call, i.e., it is necessary to deliver the subsequent call to the domain in which the user has an existing call. Thus, the mechanism in the related art, e.g., the supplementary services in the CS domain, may be employed to handle the subsequent call.

The GSM, WCDMA CS domain and cdma2000 CS domain have similar network architectures, and the intelligent networks of the PSTN, GSM, WCDMA and cdma2000 system have basically the same architecture. Moreover, the IMS defined by different organizations have similar architectures, i.e., the IMS accessed via various fixed/mobile IPCAN have similar architectures. Therefore the problem and requirement of the domain selection in the related art are the same in different systems.

SUMMARY OF THE INVENTION

Embodiments of the present invention provide a method and an apparatus of domain selection for routing control through which a domain is selected according to the call statuses of a user in different domains.

According to one aspect of the present invention, a method of domain selection for routing control, applied in a communication system comprising a Circuit Switched (CS) network and an IP Multimedia Subsystem (IMS), includes: obtaining call status(es) of a user in any one or both of the CS network and the IMS; selecting the CS network or the IMS via which an incoming call is to be delivered according to the call status(es) of the user upon receiving a routing decision query request from a routing decision query entity; and indicating the routing decision query entity to deliver the incoming call via the CS network or the IMS selected.

According to another aspect of the present invention, an apparatus for domain selection of routing control, applied in a communication system including a Circuit Switched (CS) network and an IP Multimedia Subsystem (IMS), includes:

a first unit, for obtaining call status(es) of a user in any one or both of the CS network and the IMS; a second unit, for selecting the CS network or the IMS via which an incoming call is to be delivered according to the call status(es) of the user upon receiving a routing decision query request.

When performing domain selection for the incoming call, embodiments of the present invention take consideration of the call status(es) of the user in the CS network and the IMS. If the user has an existing call in one domain, the domain in which the user has the existing call is selected to deliver the incoming call to avoid the problem of two calls are delivered respectively via two domains at the same time. Thus, the supplementary service in the related art used for handling a subsequent call in the same domain may be employed to handle the incoming call.

Embodiments of the present invention improve the method of domain selection in the related art, provide better service experience for the user and facilitate the application and development of CS network and the IMS.

DETAILED DESCRIPTION OF THE INVENTION

Figure 1:
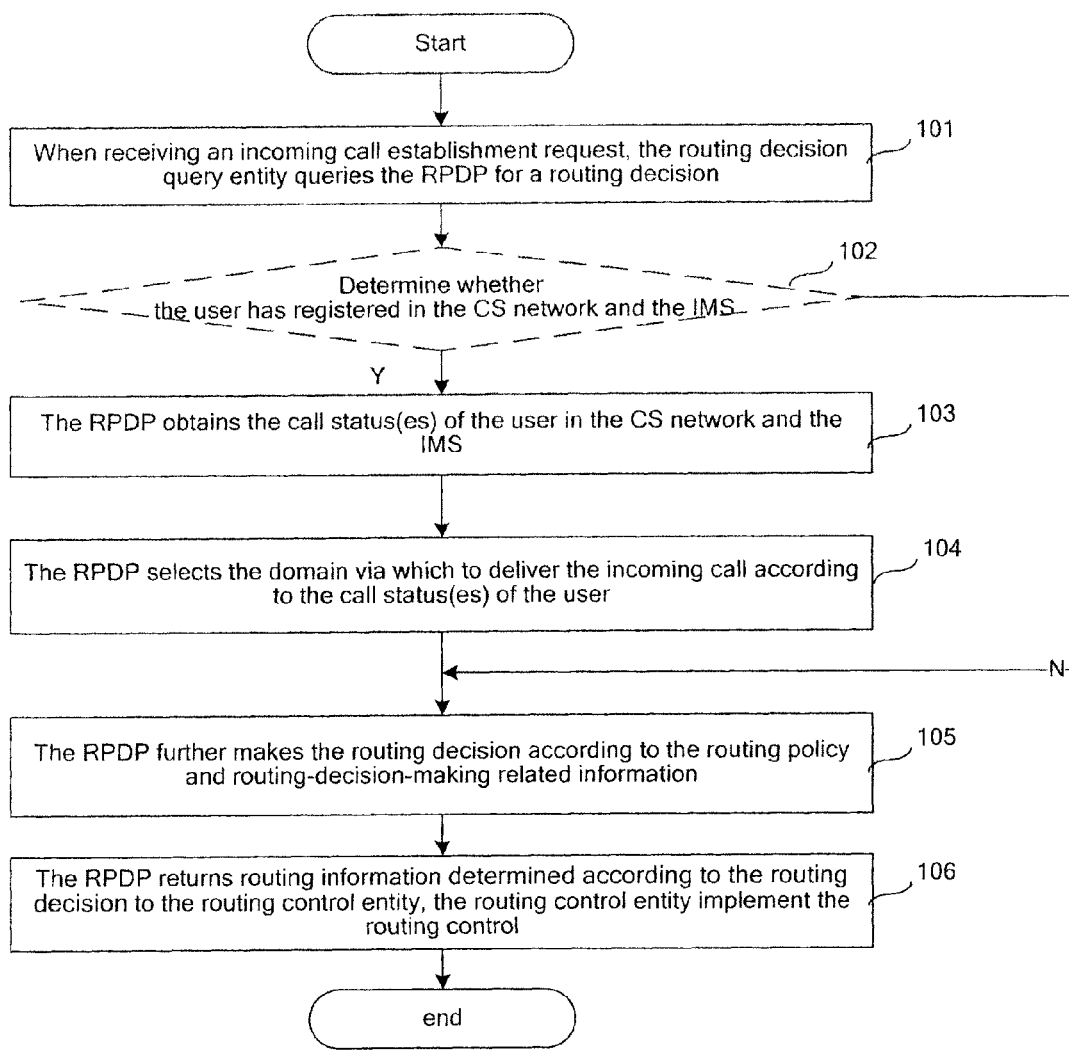
FIG. 1 is a flowchart illustrating a method of domain selection according to embodiment of the present invention.

The present invention is further described in detail hereinafter with reference to accompanying drawings and embodiments to make the technical solution and merits thereof more apparent.

The WCDMA system is taken as an example to illustrate the method of the present invention hereinafter. In embodiments of the present invention, before delivering an incoming call, the call status(es) of the user in any one or both of the CS domain and the IMS is(are) obtained. The domain an existing call uses is selected to deliver the incoming call according to the call status(es) of the user. Therefore, it may be avoided that two calls are delivered respectively via the CS domain and the IMS simultaneously. Thus, supplementary service provided for a subsequent call in the same domain with the existing call may be employed to handle the incoming call.

Several existing mechanisms adopted in embodiments of the present invention are discussed first, including Unstructured Supplementary Service Data/Short Message Service (USSD/SMS) in the CS domain, SIP subscription-and-notification mechanism and SIP publication mechanism in the IMS.

The USSD is a supplementary service introduced by GSM Phase 2 and may be initiated by either a terminal or a network side. Similar to the SMS, the USSD may also be sent within a call. But the difference is that, the USSD is real time and connection oriented, i.e., during a USSD dialogue, a wireless connection is maintained to provide a transparent channel without storing and transmitting in a middle entity. In addition, multiple successive USSD operations may be supported during one USSD dialogue. Routings of the USSD operations are determined according to a Service Code in a USSD message. Functions providing USSD applications retrieve service data from the USSD message, process and respond according to service logic. Through the USSD, network operators may provide customized services for local users. The WCDMA CS domain inherits the USSD service.

It should be noted that, cdma2000 CS domain and PSTN do not support the USSD service. But either of the GSM, the WCDMA CS domain, the cdma 2000 CS domain and the PSTN supports the SMS.

The SIP subscription-and-notification mechanism in the IMS is an SIP extension through which a first SIP User Agent (UA) may send a subscription request, i.e., a SUBSCIBE request, to a second SIP UA for subscribing of a specific event. Then the second SIP UA responds to the first SIP UA. After interactions in form of request and respond, the first SIP UA and the second SIP UA finish negotiation of a valid period of the subscription. The second SIP UA processes the subscription request following certain criteria, e.g., whether the subscription request needs to be authorized. After the subscription request is authorized, if state of the specific event changes during the valid period, the second SIP UA sends a corresponding event notification, i.e., a NOTIFY message, to the first SIP UA. During the valid period, the first SIP UA may prolong or terminate the subscription by re-sending a subscription request to the second SIP UA; otherwise, the subscription will be automatically terminated when the valid period expires. By sending a "one-off" subscription request, i.e., a subscription request with the valid period being set to 0, the subscription of a single notification with the current state, i.e., the query of the current state may be implemented.

The SIP publication mechanism is another SIP extension for initiatively publishing event state. The SIP publication mechanism allows an Event Publication Agent to publish event state of the EVA to an Event State Compositor which composites the event state and sends an event notification to a subscriber.

The IMS defined by either of 3GPP, 3GPP2 or TISPAN employs the SIP as an end-to-end session control protocol, thus supports the SIP subscription-and-notification mechanism and the SIP publication mechanism.

In current communication systems, voice service may be provided as either CS voice services in the CS domain or VoIP services in the IMS accessed via various fixed/mobile IPCAN. When the user accesses the CS domain and the IMS with terminals supporting different access technologies and there is an incoming call towards the user, embodiments of the present invention implement the method of domain selection to determine the domain via which the incoming call is to be delivered. The method of domain selection is to additionally consider the call status(es) of the user in any one or both of the CS domain and the IMS when performing the domain selection as in the related art, so as to be adapted to the fact that the UE cannot have two voice calls in the CS domain and the IMS simultaneously through one audio I/O module, and further meet the requirement of keeping on providing service capability for handling a subsequent call which already exists in the CS domain and the IMS.

In embodiments of the present invention, the obtaining of the call status(es) of the user in any one or both of the CS domain and the IMS and the selection of the domain according to the call status(es) of the user are key techniques. In respect of a first mode adopting a call-control protocol based interface in the related art, embodiments of the present invention provide two methods to obtain the call status(es) of the user, i.e., by monitoring the call status(es) of the user and locally maintaining call status information of the user, or from an aware network entity by means of modified message transmission. In respect of a second mode adopting a non-call-control protocol based interface, embodiments of the present invention also provide two methods to obtain the call status (es) of the user including interacting-and-updating and instant-querying from the aware network entity. The two methods for the second mode are also applicable to the first mode. Interactions with the aware network entity may be implemented by USSD message or SMS or SIP message. Further, as to different circumstances that the call status(es) of the user in one or both of the CS domain and the IMS are available, embodiments of the present invention provide a method for selecting a domain most likely to be used by an existing call as the domain via which the incoming call is to be delivered. In addition, when the call status(es) is obtained by two independent logic entities respectively in the CS domain and the IMS, synchronization of call status information of the user between the two independent logic entities is further considered in embodiments of the present invention. The synchronization may be implemented through an internal interface of one physical entity, or through external interaction between different physical entities.

As described above, although the requirement of domain selection is firstly proposed in 3GPP, the same requirement also exists between the CS voice call service in the cdma 2000 CS domain or the PSTN and the VoIP service in the IMS accessed via various fixed/mobile IPCAN. The GSM, the WCDMA CS domain and the cdma 2000 CS domain have similar network architectures, the intelligent networks in the PSTN, GSM, WCDMA and the cdma 2000 are basically the same, and the IMS defined by different standards have similar architectures, i.e., the IMS accessed via various fixed/mobile IPCAN have similar architectures. Therefore, the existing method of domain selection, the problem brought out by not considering the call status(es) of the user when selecting a domain for subsequent delivery and the requirement of solving the problem are similar in above scenarios. On the other hand, although the cdma 2000 CS domain and the PSTN do not support the USSD service, either of the GSM, WCDMA CS domain, cdma 2000 CS domain and the PSTN supports the SMS. And the IMS defined by the 3GPP, 3GPP2 or the TISPAN employs the SIP as the end-to-end session control protocol without exception. Therefore each of them supports the SIP subscription-and-notification mechanism and the SIP publication mechanism. Although the WCDMA system is taken as an example in embodiments of the present invention, those skilled in the art should understand that, the solutions provided by embodiments of the present invention are also applicable for solving the problem of domain selection between the CS voice call service in GSM, cdma 2000 CS domain or PSTN and VoIP service in the IMS accessed via various fixed/mobile IPCAN.

The WCDMA communication system includes a CS domain and an IMS. A user may register and use voice services in the CS domain and the IMS simultaneously. In the related art, an RPDP may be introduced into the system. During an incoming call delivering process, a process of querying a routing decision from the RPDP is added. The RPDP makes the routing decision of the domain selection according to current routing-decision-making related information of the user in any one or both of the CS domain aid the IMS and routing policy, determines routing information according to the routing decision, and returns the routing information determined.

The method of domain selection provided by embodiments of the present invention mainly includes two blocks: obtaining the call status(es) of the user and selecting a domain. In addition, there is an optional block of determining whether the user has registered in both the CS domain and the IMS. Before obtaining the call status(es) of the user, there may be an additional block of query; and after selecting the domain, there may be a block of making decision and a block of returning. A first embodiment is as shown in FIG. 1.

Block 101: A routing decision query entity queries an RPDP for routin/g decision when receiving an incoming call.

Block 102: The RPDP determines whether the user has registered in both the CS domain and the IMS; if the user has registered in both the CS domain and the IMS, the call statuses of the user in the two domains should be considered and block 103 is performed; otherwise, only the routing policy needs to be considered, and block 105 is performed. In practical applications, block 102 is optional.

Block 103: The RPDP obtains the call statuses of the user in the CS domain and the IMS and block 104 is performed. Because the RPDP selects the domain via which the incoming call is to be delivered based on the call statuses of the user in any one or both of the CS domain and the IMS, it is necessary to obtain the call statuses of the user in any one or both of the CS domain and the IMS.

Block 104: The RPDP selects the CS domain or the IMS to deliver the incoming call according to the call statuses obtained. The criterion of the selection is to deliver the incoming call to a domain that an existing call uses.

After selecting the domain, the method may further include the following blocks:

Block 105: The RPDP further makes the routing decision of the domain selection based on the routing policy and routing-decision-making related information. It can be seen from this block that, if the call status(es) of the user in any one or both of the CS domain and the IMS need to be considered, the routing decision should be made based on result of the domain selection in block 104. In other words, if the CS domain is selected in block 104, subsequent routing process will be performed in the CS domain in this block. If the CS domain is selected to be a preferential domain in block 104, other conditions should be taken into consideration to make the routing decision of the domain selection in this block. In this way the RPDP makes the routing decision based on the routing policy, the routing-decision-making related information and the call status(es) of the user in any one or both of the CS domain and the IMS.

Block 106: the RPDP determines routing information according to the routing decision, and returns the routing information determined to the routing decision query entity so that the routing decision query entity may implement subsequent routing control for the incoming call.

In the process described above, the most crucial blocks include how to obtain the call status(es) of the user in any one or both of the CS domain and the IMS, and how to perform domain selection according to the call status(es) of the user. Four methods for obtaining the call status(es) of the user are given hereafter, and three of them may further have several implementation schemes in respect of different domains and modes applied. Detailed criteria will be given to cover all possible scenarios that the call status in one of the CS domain and the IMS is known or the call statuses in both the CS domain and the IMS are known to guide the domain selection process.

The criteria of the domain selection will be described first hereafter. In the embodiment shown in FIG. 1, the detailed criteria of the domain selection according to the call status(es) in block 104 include the following.

If the RPDP obtains the call status in only one of the CS domain and the IMS, the RPDP judges the call status of the user in this domain. If the call status in this domain is active or in progress, the RPDP determines to select this domain for subsequent routing; if the call status in this domain is idle, the RPDP determines to select the other domain to be a preferential domain for subsequent routing. The reason for such selection is that if the call status in only one domain is known and the call status in this domain is active or in progress, it can be affirmatively deduced that there is an existing call in this domain, and the incoming call should be delivered via this domain. If the call status in this domain is idle, it may be possible that there is an existing call in the other domain, so that the incoming call is preferentially delivered via the other domain to avoid the problem that two calls are respectively delivered via two domains at the same time.

If the RPDP obtains the call statuses of the user in both the CS domain and the IMS, the RPDP judges whether the call statuses are idle in both the CS domain and the IMS. If the call statuses are idle in both the CS domain and the IMS, the RPDP determines to select the CS domain and the IMS with the same priority. Otherwise, the RPDP determines to select the domain in which the call status is active or in progress for subsequent routing. The reason for such selection is that if the call statuses are idle in both the CS domain and the IMS, the incoming call may be delivered via either domain without arousing the problem of two calls are respectively delivered via two domains at the same time. In this case, the two domains have the same priority to be selected and the RPDP performs the domain selection according to the current routing policy. If the call status of the user is active or in progress in one of the CS domain and the IMS, the RPDP selects this domain with a higher priority. Theoretically, it is impossible that the call statuses in both the CS domain and the IMS are active or in progress.

The obtaining of the call status(es) of the user will be described hereinafter in respect of four methods and different implementation schemes for each method. First, the four methods are briefly described in respect of whether the call-control protocol based interface, i.e., the first mode, or the non-call-control protocol based interface, i.e., the second mode, is adopted.

If the first mode is adopted, the RPDP may obtain the call status(es) of the user by monitoring the call status(es) and locally maintaining call status information of the user, or obtain the call status(es) of the user from an incoming call establishment request modified by an aware network entity. If the second mode is adopted, the RPDP may obtain the call status(es) of the user by interacting-and-updating or instant-querying from the aware network entity. The two methods for the first mode are also applicable to the second mode.

The details of the four methods will be described with reference to the embodiments of the present invention hereinafter.

Firstly, if the first mode is adopted, the RPDP may obtain the call status(es) of the user by monitoring the call status(es) and locally maintaining the call status information of the user. In other words, based on the embodiment shown in FIG. 1, the RPDP obtains the call status(es) of the user by monitoring the call status(es) of the user and locally maintaining the call status information of the user in block 103. The obtaining of the call status(es) may include: the RPDP monitors a status and a handling process of a relevant call through the call-control protocol based interface. Then the RPDP updates the call status information of the user locally maintained upon any one or any combination of establishing, connecting and releasing of the relevant call.

The RPDP may implement the monitoring of the status and the handling process of the call which is trigged to the RPDP for routing decision query by utilizing existing mechanism of the call-control protocol based interface. For example, in the CS domain, if the call-control protocol based interface is a CAP interface between VMSC/GMSC and gsmSCF, a gsmSCF which functions as the RPDP configures Basic Call Status Model (BCSM) event Detection Point (DP) of any one or any combination of call answer and call disconnect at the VMSC/GMSC which functions as a gsmSSF, thereby implementing the monitoring of the status and handling process of the call. In the IMS, if the call-control protocol based interface is an ISC interface between an S-CSCF and an AS, the RPDP which functions as the AS keeps the RPDP in a signaling path by controlling in a Proxy mode and adding a domain name of the RPDP into a Record-Route header field, or by controlling in a Back-to-Back User Agent (B2BUA) mode, thereby implementing the monitoring of the status and handling process of the call. Meanwhile, the RPDP updates the call status information of the user locally maintained upon any one or any combination of establishing, connecting and releasing of the call in any one or both of the CS domain and the IMS.

Secondly, if the first mode is adopted, the RPDP may also obtain the call status(es) of the user from the incoming call establishment request modified by an aware network entity and transferred to the RPDP. In other words, based on the embodiment shown in FIG. 1, the route decision query request received by the RPDP in block 102 is actually the incoming call establishment request modified by the aware network entity. The RPDP obtains the call status(es) of the user from the modified incoming call establishment request. The obtaining of the call status(es) may include two blocks: when the incoming call establishment request arrives at an AS monitoring the call status(es) before arriving at the RPDP, the AS functions as the aware network entity and modifies the incoming call establishment request according to the call status information and keeps on transferring the modified incoming call establishment request. Thus, when subsequently receiving the modified incoming call establishment request as the routing decision query request, the RPDP may obtain the call status(es) of the user from the modified incoming call establishment request.

The method of obtaining the call status(es) of the user from the modified incoming call establishment request described above is actually applied in the IMS. At this time, the call-control protocol based interface though which the routing decision query is performed is the ISC interface between the S-CSCF and AS in the IMS. In the existing IMS, the S-CSCF triggers service requests to corresponding ASs in an order according to initial Filter Criteria (iFCs) arranged with priority in user profile. When processing an incoming call establishment request, if the priority of the iFC corresponding to the AS monitoring the call status(es) is higher than that of the AS functioning as the RPDP, the incoming call establishment request will be transferred to the AS monitoring the call status(es) first. The AS monitoring the call status(es) may modify the incoming call establishment request and keeps on transferring the modified incoming call establishment request. Therefore, when subsequently receiving the modified incoming call establishment request as the routing decision query request, the AS functioning as the RPDP may obtain the call status(es) of the user from the modified incoming call establishment request.

An interacting-and-updating method, which is applicable to both the first mode and the second mode is provided hereafter. In this method, the RPDP interacts with the aware network entity to obtain the call status(es) of the user. The aware network entity refers to a network entity aware of the call status(es), e.g., a Presence server, an AS or CAMEL service control function monitoring the call status(es), User Equipment (UE), etc. Based on the embodiment shown in FIG. 1, when the call status(es) changes in block 103, the aware network entity sends a notification notifying the change of the call status(es) to the RPDP. The RPDP updates the call status information locally maintained according to the notification. If the aware network entity is the UE and the IMS is adopted, the interacting-and-updating is performed after the user registers in the IMS; if the aware network entity is the UE and the CS domain is adopted, the interacting-and-updating is performed after the user finishes registration/location updating in the CS domain.

The interacting-and-updating method includes: the RPDP locally maintains the call status information of the user in any one or both of the CS domain and the IMS. When the call status(es) of the user changes, the aware network entity sends a notification to the RPDP notifying a change of the call status(es) of the user. The RPDP updates the call status information locally maintained according to the notification. The implementation of the interacting-and-updating method will be described hereinafter with four schemes respectively in the CS domain and the IMS, i.e., a first scheme adopting SIP subscription-and-notification mechanism in the IMS, a second scheme adopting SIP publication mechanism in the IMS; a third scheme adopting USSD/SMS based subscription-and-notification mechanism in the CS domain, and a fourth scheme adopting USSD/SMS based publication mechanism in the CS domain.

The first scheme is the scheme adopting the SIP subscription-and-notification mechanism in the IMS. In the first scheme, the RPDP subscribes to a relevant event from the aware network entity in advance, the detailed process includes:

Block a1: The RPDP sends an SIP SUBSCRIBE message to the aware network entity to subscribe for a call status relevant event. The aware network entity accepts the subscription, returns an acknowledgement to the RPDP, and finishes a negotiation of a valid period of the subscription during the process of subscription.

Block a2: During the valid period of the subscription, if detecting that the call status(es) of the user in any one or both of the CS domain and the IMS changes, the aware network entity sends a call status change event notification notifying a call status change event to the RPDP. After receiving the call status change event notification, the RPDP returns an acknowledgement to the aware network entity.

Block a3: Before the valid period of the subscription expires, the RPDP may send a new SUBSCRIBE message to the aware network entity to update the subscription on demand. The aware network entity returns an acknowledgement after accepting the new SUBSCRIBE message, and finishes a re-negotiation and re-initiation of the valid period of the new subscription. The RPDP may update the subscription according to actual requirements. For example, the RPDP may update the subscription if it is determined that the user has not deregistered from the IMS, or on demand of the domain selection logic of the RPDP regardless of the register status of the user.

The second scheme is the scheme adopting the SIP publication mechanism. In the second scheme, the aware network entity publishes, when the call status(es) of the user in any one or both of the CS domain and the IMS changes, a call status change event to the RPDP through an SIP PUBLISH message according to local settings. The RPDP records the call status (es), returns an acknowledgement and updates the call status information locally maintained.

The third scheme is the scheme adopting the USSD/SMS based subscription-and-notification mechanism, includes the following blocks.

Block b1: The RPDP sends a USSD/SMS message to the aware network entity to subscribe for a call status relevant event.

Block b2: When detecting that the call status(es) of the user in any one or both of the CS domain and the IMS changes, the aware network entity notifies the RPDP of a call status change event through another USSD/SMS message. The RPDP updates the call status information of the user locally maintained.

The fourth scheme is the scheme adopting the USSD/SMS based publication mechanism which is similar to the scheme adopting the SIP publication mechanism. But the USSD/SMS based publication mechanism is based on USSD/SMS application in the CS domain. When detecting that the call status(es) of the user in any one or both of the CS domain and the IMS changes, the aware network entity publishes a call status change event to the RPDP through a USSD/SMS message according to local settings. The RPDP updates the call status information locally maintained and returns an acknowledgement to the aware network entity.

It can be understood by those skilled in the art that other schemes may also be adopted other than the four schemes described above for the interacting-and-updating process between the RPDP and the aware network entity in the CS domain or the IMS without affecting the substance or the protection scope of the present invention.

Finally, another method applicable for both the first mode and the second mode is given, i.e., the instant-querying method. Based on the embodiment shown in FIG. 1, when the RPDP needs to obtain the call status(es) of the user, the RPDP queries the aware network entity for the call status(es). In other words, the RPDP does not store the call status information of the user in any one or both of the CS domain and the IMS. Instead, the RPDP queries the aware network entity for the call status information when the RPDP needs to obtain the call status(es). The aware network entity returns the call status information to the RPDP.

The instant-querying method also has two implementation schemes respectively in the CS domain and the IMS, i.e., a first scheme adopting SIP "one-off" subscription-and-notification mechanism in the IMS and a second scheme adopting USSD/SMS based querying mechanism in the CS domain.

The first scheme includes: when the RPDP needs to obtain the call status(es) of the user, the RPDP sends an SIP SUBSCRIBE message with valid period being set as 0 to the aware network entity to subscribe to a call status relevant event. The aware network entity accepts the "one-off" subscription, returns an acknowledgement, and returns the call status information to the RPDP. The aware network entity does not initiatively notify the RPDP when the call status(es) changes and the RPDP need not locally maintain the call status information.

The second scheme includes: when the RPDP needs to obtain the call status(es) of the user, the RPDP sends a USSD/SMS message to the aware network entity to query the call status(es). The aware network entity notifies the RPDP of the call status information through another USSD/SMS message. Similarly, the aware network entity does not initiatively notify the RPDP when the call status(es) changes and the RPDP need not locally maintain the call status information.

It can be understood by those skilled in the art that, other schemes may be adopted for performing the instant-querying other than the two schemes provided by the embodiments of the present invention, to achieve the purpose of the present invention without affecting the substance or the protection scope of the present invention.

In the above four methods of obtaining the call status(es) of the user in any one or both of the CS domain and the IMS, the RPDP and the aware network entity may be co-located in the same physical entity. In this case, the RPDP obtains the call status(es) of the user from the aware network entity through an internal interface.

The embodiments of the present invention also consider a situation that the RPDP is implemented by two independent logic entities respectively in the CS domain and the IMS, which brings about the requirement of synchronization of the call status information in the CS domain and the IMS. Therefore, if the RPDP is implemented by two independent logic entities respectively in the CS domain and the IMS based on the embodiment shown in FIG. 1, the method further includes the synchronization of the call status information between the two logic entities.

Furthermore, the two logic entities of the RPDP in the CS domain and the IMS may be co-located in the same physical entity or located in two different physical entities. If the two logic entities are co-located in the same physical entity, the interface between the two logic entities is an internal interface through which the synchronization of the call status information is achieved. If the two logic entities are located in two different physical entities, the two logic entities may interact with each other through any one of SIP, CAP, Wireless Intelligent Network (WIN) protocol, INAP, USSD/SMS, or through other self-defined method.

In addition, according to different implementations, the synchronization may include two schemes: notifying upon change and querying on demand. The scheme of notifying upon change includes: sending, by either of the two logic entities, a notification to the other logic entity upon finding the change of the call status information. The other logic entity updates the user status information according to the notification. The scheme of querying on demand includes: either of the two logic entities queries the other logic entity for the call status information when necessary, the other logic entity returns the call status information in response to the querying.

It can be understood by those skilled in the art that the two types of interfaces and the two synchronization schemes described above may be replaced by other interfaces and other synchronization schemes without affecting the substance or the protection scope of the present invention. For example, when the two logic entities are co-located in the same physical entity, the two logic entities may access a shared data field to obtain the synchronized call status information.

The overall flowchart of the method of domain selection is described hereafter with reference to accompanying drawings to illustrate the signaling interaction in which varieties of interfaces and interaction methods are employed.

Figure 2A:
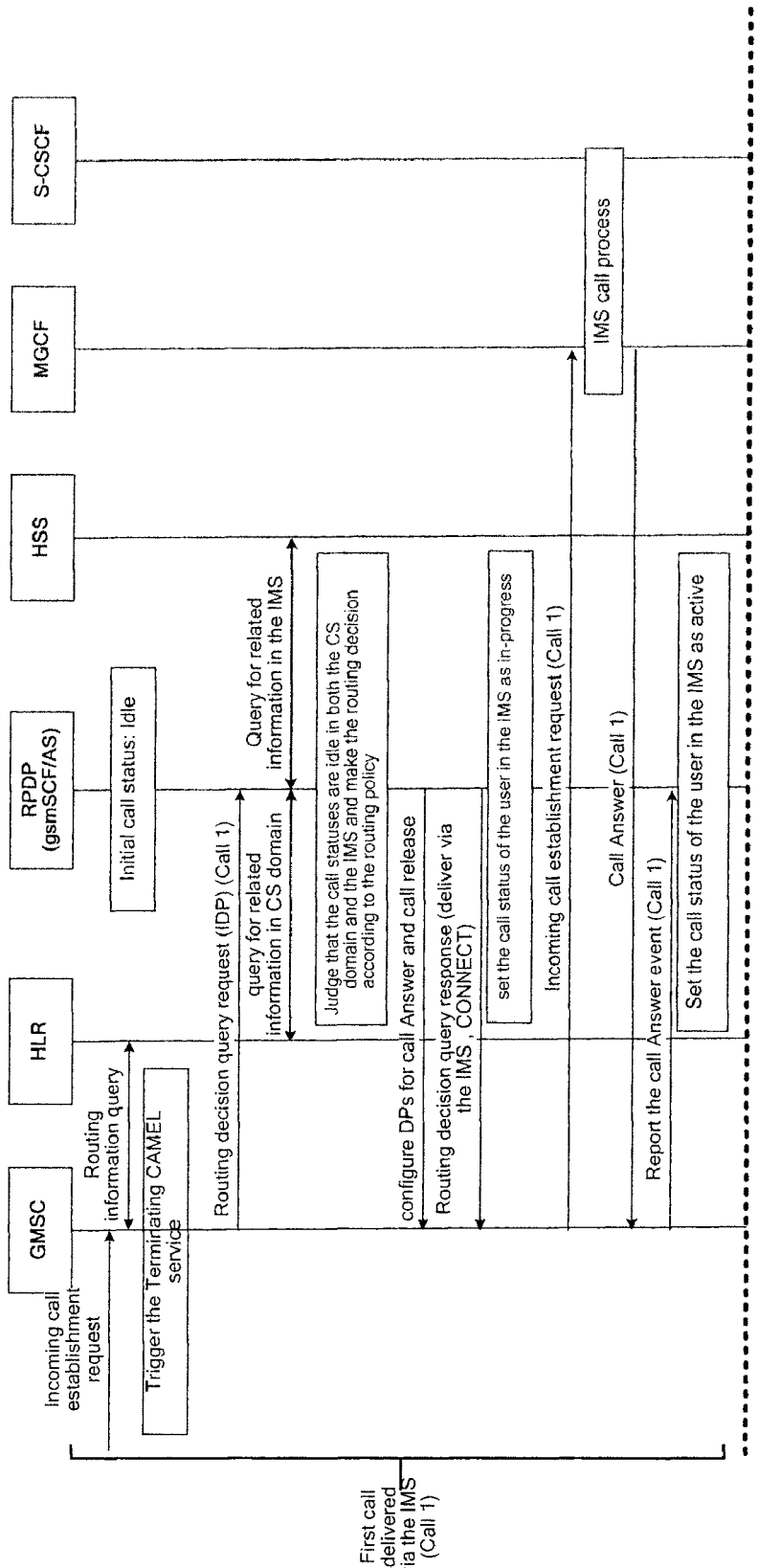
FIGS. 2A and 2B are message flows of a method of domain selection according to an embodiment of the present invention in which the call status(es) of the user is obtained by means of monitoring the call status(es) and locally maintaining the call status information.
Figure 2B:
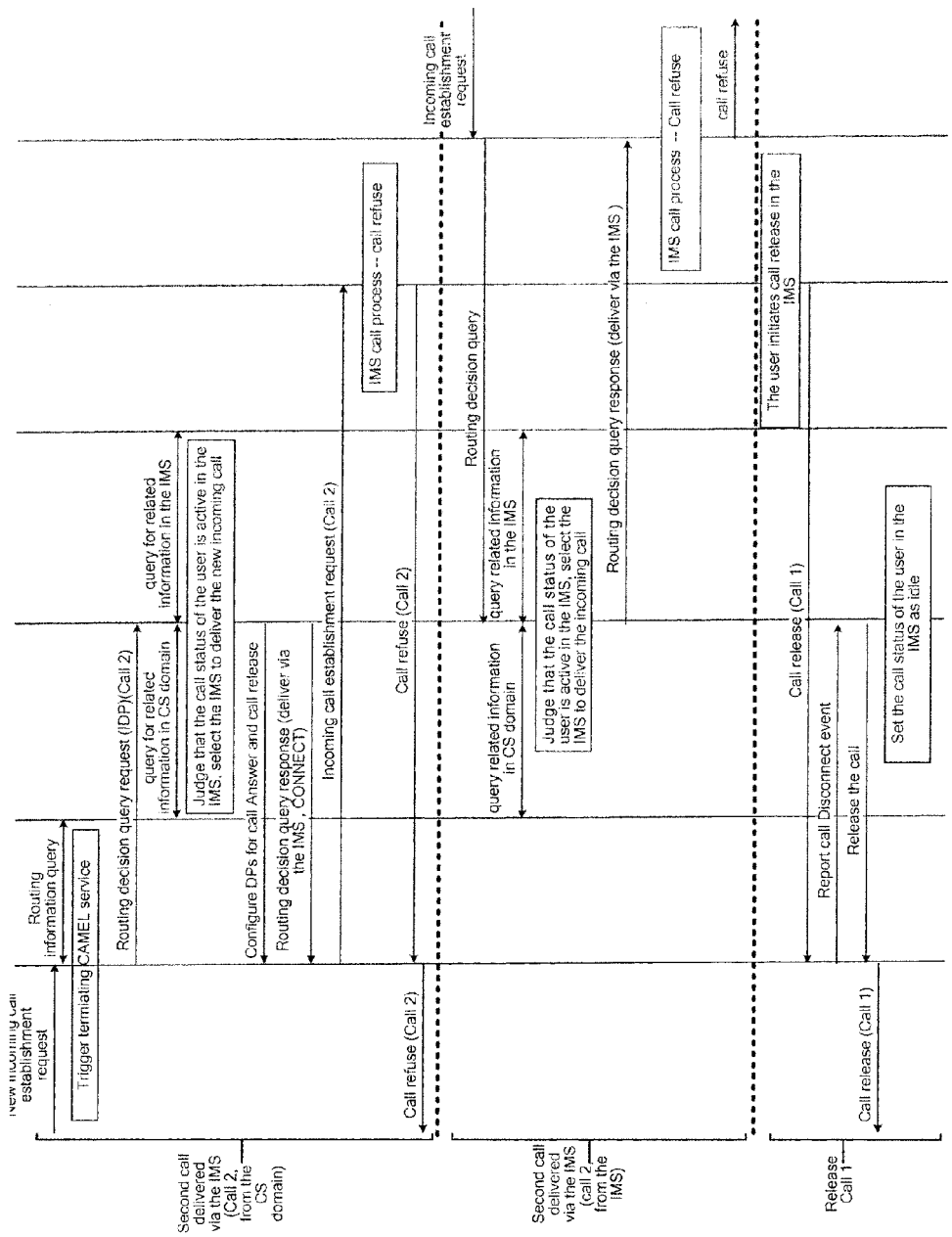

FIG. 2 is a flowchart of a method of domain selection in which the call status(es) of the user is obtained through monitoring the call status(es) and locally maintaining the call status information under the first mode.

Upon the receipt of an incoming call establishment request, a GMSC queries an HLR of a callee for routing information. The HLR returns Terminating CAMEL Subscription Information (T-CSI) of the callee according to a user profile of the callee. The GMSC triggers a terminating CAMEL service according to the T-CSI and thus initiates the query to the RPDP which functions as the gsmSCF for the routing decision through the CAP interface. Although the protocols adopted by the GSMC for interaction with the HLR or the intelligent network service control function are different in GSM, WCDMA CS domain and cdma2000 CS domain, the process and capability are similar. In the PSTN, although the routing query process is not required and the intelligent service of the user is triggered by a local exchanger of the user instead of the GMSC, the service control process and the control capability of the interaction with the fixed intelligent network service control function are similar. Hereinafter only the WCDMA CS domain is taken as an example, other scenarios are not repeated herein.

The RPDP interacts with the HLR/HSS to query the register statuses of the user in the CS domain and the IMS. If the user has registered in both the CS domain and the IMS, the RPDP judges the call status information of the user in the two domains locally maintained. It should be noted that, in this embodiment an optional block of querying the register statuses of the user in the two domains is provided, because the call status can never be active in a domain in which the user has not registered, the optional block optimizes the implementation of the embodiment of the present invention.

Because the call status(es) of the user is initialized to be idle, the RPDP makes the routing decision according to the current routing policy. For example, if the RPDP determines to select the IMS to deliver the incoming call, the RPDP returns a redirection number pointing to a CS/IMS interworking gateway MGCF to the GMSC through a Connect message. In order to monitor the entire handling process of the incoming call, before returning the redirection number, the RPDP issues a Request Report BCSM Event (RRBE) message to the GMSC to configure BCSM event DPs for call Failure, call Abandon, call Answer, and call Disconnect events. Then the RPDP changes the call status of the user in the IMS as in progress. The DP for the call Answer event is optional, and if the DP for the call Answer event is not configured, the RPDP changes the call status of the user in the IMS to be active.

The GMSC delivers, according to the redirection number, the incoming call to the CS/IMS interworking gateway MGCF which controls subsequent routing of the incoming call to the IMS. If the DP of call Answer event has been configured, the GMSC reports, upon the receipt of the call Answer event, the call Answer event to the RPDP which functions as the gsmSCF. The RPDP changes the call status of the user in the IMS to be active.

Thereafter, when receiving a new incoming call establishment request, the GMSC or S-CSCF queries the RPDP for the routing decision. For the GMSC, the query is performed by triggering a terminating CAMEL service while the RPDP functions as a gsmSCF. And for the S-CSCF, the query is performed by triggering a terminating service in the IMS while the RPDP functions as an AS. Furthermore, the two logic entities of the RPDP respectively in the CS domain and the IMS interact with each other through an internal or external interface to synchronize the call status information of the user.

The RPDP interacts with the HLR/HSS to query the register statuses of the user in the CS domain and the IMS. If the user has registered in both the CS domain and the IMS, the RPDP further judges the call status(es) of the user in the two domains. Because the call status of the user in the IMS has been changed to be active, the RDPD determines that the domain via which the new incoming call is to be delivered should be the IMS, and returns a corresponding instruction and routing information to the GMSC/S-CSCF.

The GMSC/S-CSCF delivers the new incoming call to the IMS according to the instruction and routing information received. If new incoming call is determined to be refused in the subsequent call handling process in the IMS, the GMSC/S-CSCF returns a call refuse message to a caller to terminate the call handling process.

Subsequently, the user releases the previous call (Call 1) in the IMS. After receiving a call release message, the GMSC reports the call Disconnect event to the RPDP which functions as the gsmSCF. The RPDP changes the call status of the user in the IMS to be idle and instructs the GMSC to continue with the call release process. Then the GMSC continues with the call release process.

It should be noted that the embodiment shows the process in which the RPDP that functions as the gsmSCF sends an RRBE message to the GMSC which functions as the gsmSSF to configure corresponding DPs for the BCSM events so as to monitor the status and handling process of the incoming call. In order to monitor the status and handling process of an outgoing call in the CS domain, the VMSC where the user currently locates functions as the gsmSSF and triggers, according to the subscription data of the user, intelligent service by establishing a call control connection to the RPDP which functions as the gsmSCF. And the RPDP sends to the VMSC the RRBE message to configure related BCSM DPs including call Failure, caller Abandon, call Answer (optional) and call Disconnect. The VMSC reports the call events to the RPDP during corresponding call process according to the configurations, and the RPDP updates the call status information accordingly. The process is also performed based on existing CAMEL capabilities and will not be repeated herein.

In addition, when the routing decision query for the previous call is performed in the IMS, the process is similar, and the difference lies in that: the S-CSCF assigned to the user triggers the call to the RPDP which functions as an AS to establish a call control connection for both the incoming call and the outgoing call, then the RPDP keeps the RPDP in the signaling path by controlling in the Proxy mode and adding the domain name of the RPDP into the Record-Route header field or by controlling in the B2BUA mode so as to monitor the handling process in the IMS.

Figure 3:
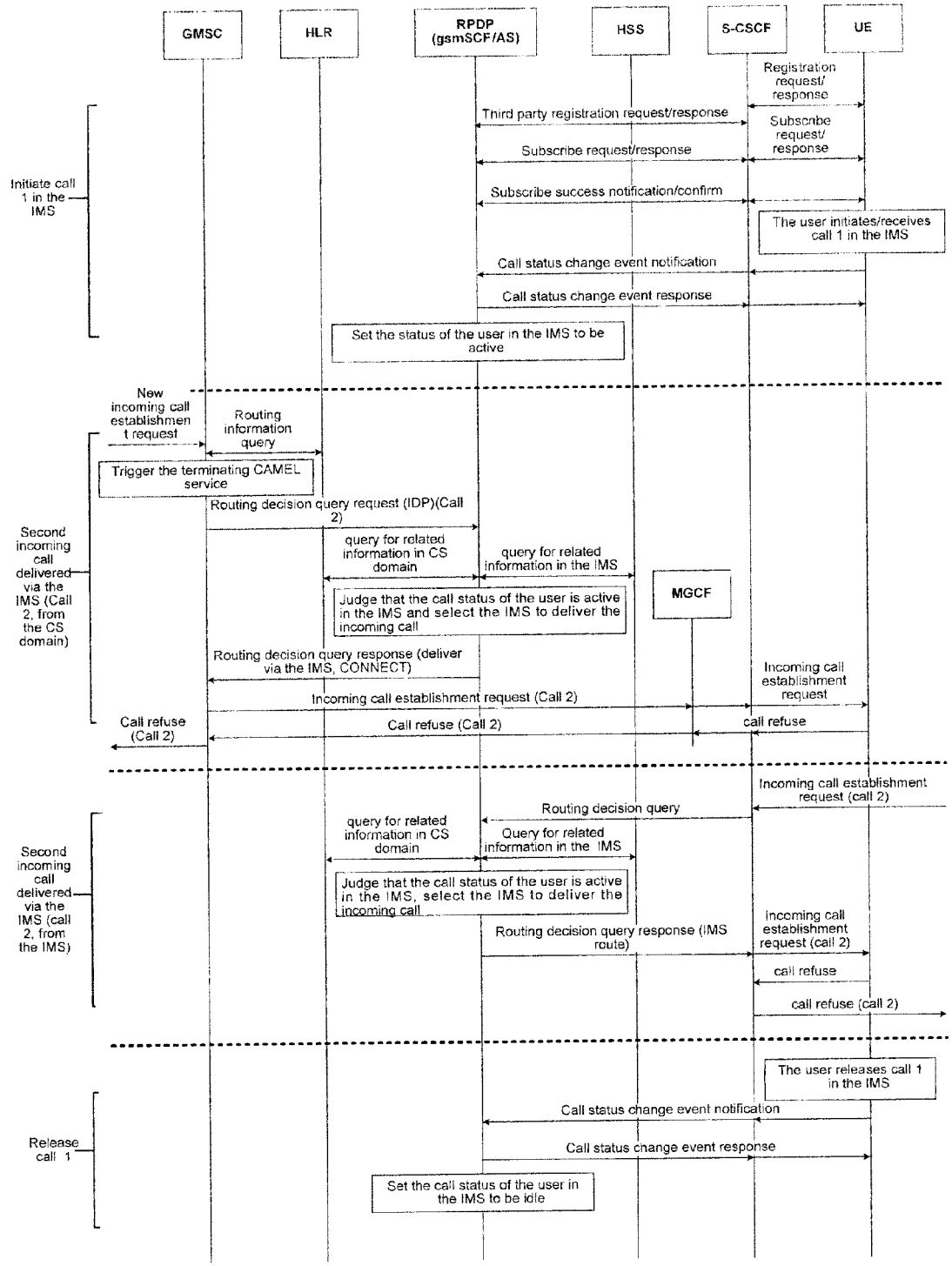
FIG. 3 is a message flow of a method of domain selection according to an embodiment of the present invention in which the call status(es) of the user is obtained by means of interacting-and-updating adopting an SIP subscription-and-notification mechanism.

FIG. 3 is a flowchart of a method of domain selection in which the call status(es) of the user is obtained through the interacting-and-updating with the aware network entity under the first mode. In this embodiment, the UE functions as the aware network entity. The interacting-and-updating process is performed through the scheme adopting the SIP subscription-and-notification mechanism.

The embodiment shown in FIG. 3 differs from FIG. 2 in that the domain selection in FIG. 3 is achieved based on interacting-and-updating process. The interacting-and-updating process is implemented through the SIP subscription-and-notification mechanism. When the user registers in the IMS, the RPDP which functions as an AS subscribes to a call status relevant event to the UE according to a third party registration request. Because the process shown in FIG. 3 is also based on the call-control protocol based interface, the subsequent call process in the CS/IMS is similar to that shown in FIG. 2.

When the user registers in the IMS, after returning a response confirming the success of registration to the user, the S-CSCF initiates a third party registration request to the RPDP which functions as an AS according to the iFC in the subscription data of the user. The RPDP returns a success response to the S-CSCF and initiates a call status relevant event subscription to the UE carrying an initial valid period of subscription. The UE returns a call status relevant event subscription response carrying the confirmed valid period to complete the negotiation of the valid period of the subscription, and sends a success notification. Subsequently, when the user initiates/receives a call in any one or both of the CS domain and the IMS, the UE sends a call status change event notification to the RPDP according to the subscription. Hereinafter, the case that the user initiates/receives a call in the IMS is taken as an example. The RPDP changes the call status of the user in the IMS to be active.

Thereafter, when receiving a new incoming call establishment request, the GMSC or the S-CSCF queries the RPDP for the routing decision. For the GMSC, the query is performed by triggering a terminating CAMEL service while the RPDP functions as a gsmSCF. And for the S-CSCF, the query is performed by triggering a terminating service in the IMS while the RPDP functions as an AS. Furthermore, the two logic entities of the RPDP respectively in the CS domain and the IMS interact with each other through an internal or external interface to synchronize the call status information of the user.

The RPDP interacts with the HLR/HSS to query the register statuses of the user in the CS domain and the IMS. If the user has registered in both the CS domain and the IMS, the RPDP judges the call status information of the user in the two domains locally maintained. Because the call status of the user in the IMS has been changed to be active, the RDPD determines that the domain via which the incoming call is to be delivered should be the IMS, and returns a corresponding instruction and routing information to the GMSC/S-CSCF.

The GMSC/S-CSCF delivers the incoming call to the IMS according to the instruction and routing information received. If the incoming call is determined to be refused in the subsequent call handling process in the IMS, the GMSC/S-CSCF returns a call refuse message to the caller to terminate the call handling process.

Subsequently, the user releases the previous call (Call 1) in the IMS. The UE sends a call status change event notification to the RPDP according to the subscription. The RPDP changes the call status of the user in the IMS to be idle.

It should be noted that, in this embodiment the SIP subscription-and-notification mechanism is adopted and the subscription is initiated by the AS upon receiving the third party registration request when the user registers. Subscriptions initiated at other time are also applicable. For example, the AS may initiate the subscription upon an instruction of the operator after the user has registered. In addition, the AS subscribing for the call status relevant event to the UE is adopted in this embodiment, the AS may also subscribe to other network entities aware of the call status(es), e.g., a Presence server or another gsmSCF or AS monitoring the entire handling process of the call in any one or both of the CS domain and the IMS.

Except for the scheme adopting SIP subscription-and-notification mechanism, the notification of the call status change event may also be implemented by scheme adopting the SIP publication mechanism or the USSD/SMS based subscription-and-notification mechanism or USSD/SMS based publication mechanism. The major difference between the scheme adopting USSD/SMS based subscription-and-notification or publication mechanism and the scheme adopting SIP subscription-and-notification or publication mechanism is that: in the scheme adopting USSD/SMS based subscription-and-notification or publication mechanism, the RPDP and the network entity in charge of notification/publication of the call status change event shall provide USSD/SMS applications, and interact with each other through the USSD/SMS in the CS domain carrying corresponding subscription-and-notification or status publication instead of SIP messages in the IMS; the rest handling processes of the scheme adopting USSD/SMS based subscription-and-notification or publication mechanism and the scheme adopting SIP subscription-and-notification or publication mechanism are basically the same.

Figure 4:
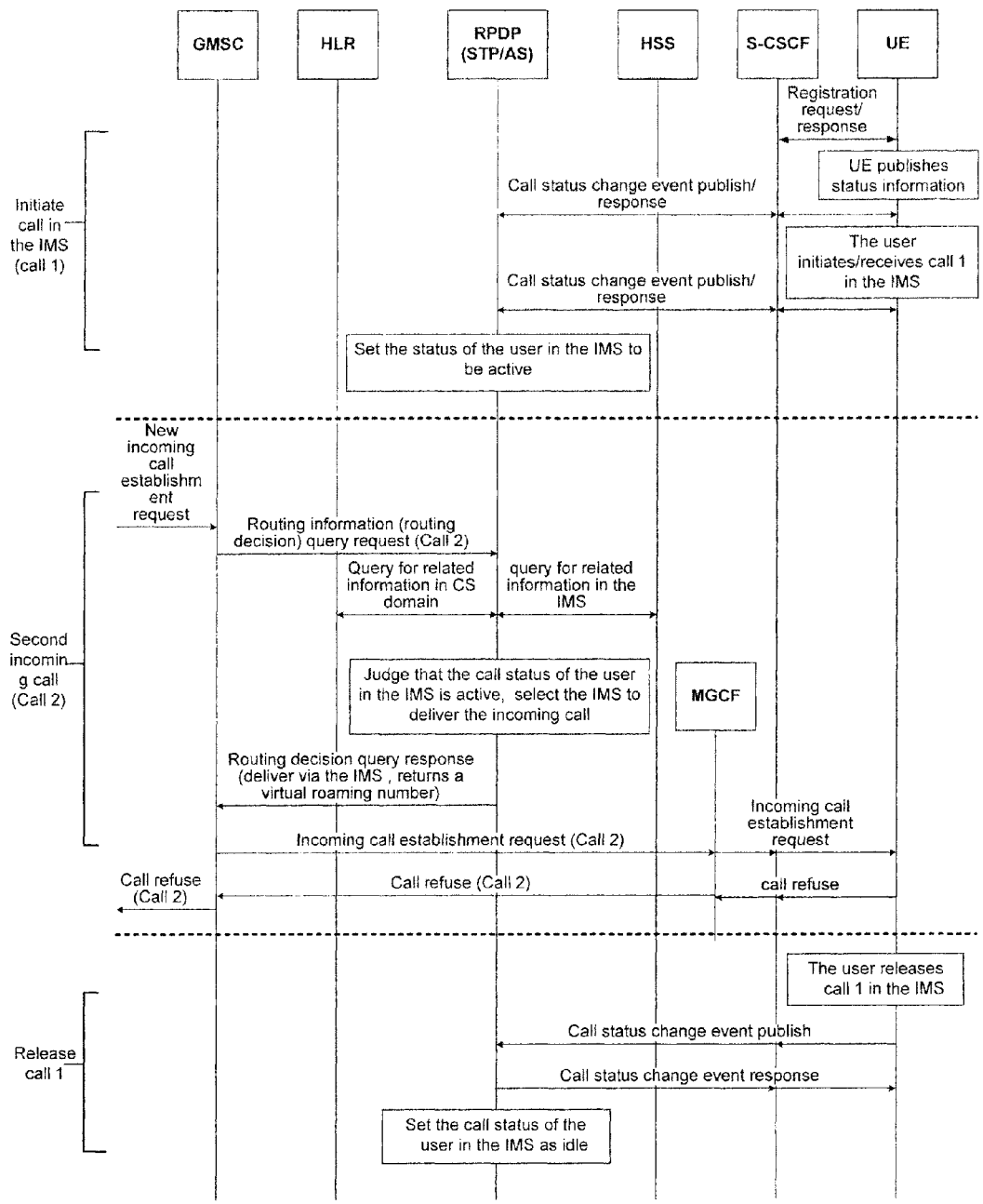
FIG. 4 is a message flow of a method of domain selection according to an embodiment of the present invention in which the call status(es) of the user is obtained by means of interacting-and-updating adopting an SIP publication mechanism.

FIG. 4 is a flowchart of the method of domain selection in which the call status(es) of the user is obtained through the interacting-and-updating with the aware network entity under the second mode, and the interacting-and-updating process is performed through the scheme adopting SIP publication mechanism.

The embodiment of the method of domain selection shown in FIG. 4 is also based on the method of locally maintaining the call status information of the user and updating the call status information according to the call status change event notification, similar to the process shown in FIG. 3. However, the embodiment shown in FIG. 4 adopts the SIP publication mechanism to issue the call status change event notification and the UE publishes the call status to the RPDP which functions as an AS according to local settings upon registration in the IMS or change of the call status(es).

In addition, unlike the embodiments shown in FIGS. 2 and 3, the embodiment shown in FIG. 4 adopts the second mode in the CS domain, i.e., the RPDP which functions as an Signaling Transfer Point (STP) intercepts the routing information query request sent from the GMSC in the CS domain to the HLR, so as to implement the domain selection.

If the user has registered in the IMS, the UE publishes the call status (idle) to the RPDP which functions as an AS. The RPDP returns a call status change event publication response to the UE and sets the call status of the user in the IMS to be idle. When the user initiates or receives a call in the IMS subsequently, the UE publishes a change of the call status to the RPDP. The RPDP returns a call status change event publication response and changes the call status of the user in the IMS to be active.

After that, when the GMSC receives a new incoming call establishment request, the GMSC queries the HLR of the callee for the routing information, the RPDP which functions as an STP intercepts the routing information query request and treats the intercepted routing information query request as routing decision query request, and makes the routing decision according to the register statuses of the user in the CS domain and the TMS and the call status of the user in the IMS, determines to select the IMS as the domain via which the new incoming call is delivered. The RPDP directly returns a corresponding instruction and routing information to the GMSC. The GMSC performs subsequent routing process to the IMS according to the instruction and the routing information. If the new incoming call is refused in the subsequent handling process in the IMS, similar to FIG. 3, the GMSC returns a call refuse message to the caller and terminates the handling process of the new incoming call.

Subsequently, the UE releases the previous call (Call 1) in the IMS, publishes the call status change event to the RPDP which functions as an AS. The RPDP returns a call status change event publication response and changes the call status of the user in the IMS to be idle.

It should be noted that in the process in FIG. 4 the UE publishes the call status change event to the RPDP which functions as an AS. However, another aware network entity, e.g., a Presence server or another gsmSCF or an AS monitoring the entire handling process of the call in any one or both of the CS domain and the IMS, may also be adopted to publish the call status change event to the RPDP.

In this embodiment, the SIP publication mechanism is adopted to implement the notification of the call status change event. However, the notification of the call status change event may also be implemented by the scheme adopting the SIP subscription-and-notification mechanism or the scheme adopting USSD/SMS based subscription-and-notification or publication mechanism. The major difference between the scheme adopting USSD/SMS based subscription-and-notification or publication mechanism and the scheme adopting SIP subscription-and-notification or publication mechanism includes: in the scheme adopting USSD/SMS based subscription-and-notification or publication mechanism, the RPDP and the network entity in charge of notification/publication of call status change event shall provide USSD/SMS applications and interact with each other through the USSD/SMS in the CS domain carrying corresponding subscription-and-notification or status publication instead of SIP messages in the IMS. The rest handling processes of the scheme adopting USSD/SMS based subscription-and-notification or publication mechanism and the scheme adopting SIP subscription-and-notification or publication mechanism are basically the same.

Furthermore, the embodiments shown in FIGS. 3 and 4 are implemented under the first mode and the second mode respectively, and illustrate the method of domain selection in which the call status(es) of the user is obtained by interacting-and-updating with the aware network entity. It can be concluded from the foregoing description that the process in which the call status(es) of the user is obtained by interacting-and-updating with the aware network entity is independent of the type of the interface between the RPDP and the routing decision query entity. Therefore the technical scheme and the applications in which the call status(es) of the user is obtained by interacting-and-updating with the aware network entity are applicable to the method of domain selection implemented in both the first mode and the second mode.

Figure 5:
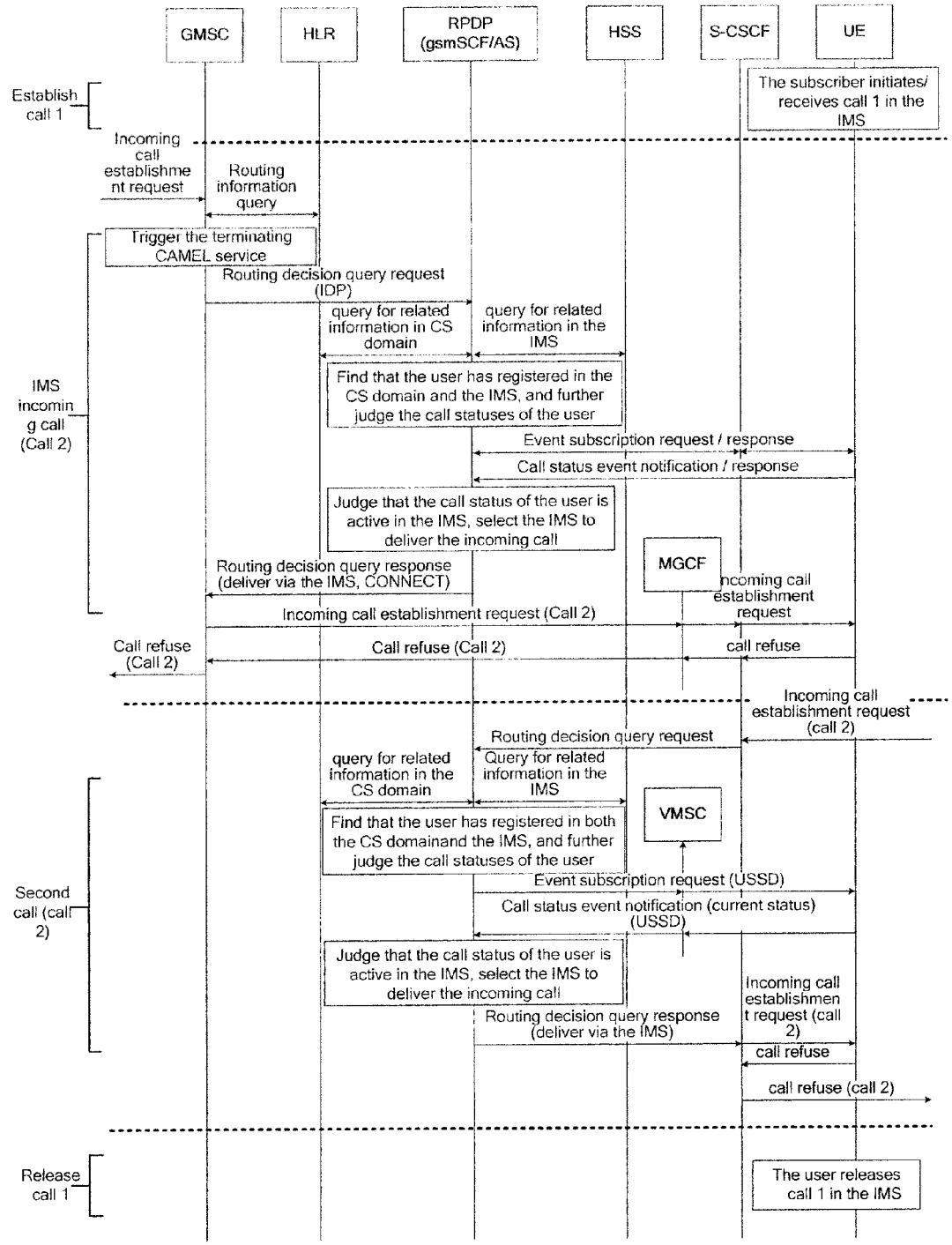
FIG. 5 is a message flow of a method of domain selection according to an embodiment of the present invention in which the call status(es) of the user is obtained by means of instant-querying.

FIG. 5 is a flowchart illustrating the method of domain selection in which the call status(es) of the user is obtained by instant-querying from the aware network entity.

Unlike the embodiment shown in FIG. 4, the embodiment shown in FIG. 5 adopt the instant-querying method to obtain the call status(es) to implement the domain selection, and two implementation schemes including the scheme adopting SIP "one-off" subscription-and-notification mechanism in the IMS and the scheme adopting USSD/SMS querying mechanism in the CS domain are provided to implement the instant-querying of the call status(es) from the UE.

The difference between this embodiment and the embodiments described above lies in the block of the obtaining of the call status(es). The obtaining of the call status(es) in this embodiment is applicable for both the first mode and the second mode. If the first mode in the CS domain is adopted, the processing of the subsequent call is similar to the embodiment shown in FIG. 4. If the first mode in the IMS is adopted, the processing of the subsequent call is similar to the embodiments shown in FIGS. 2 and 3.

Provide that before the GMSC or S-CSCF receives an incoming call establishment request, the user has already initiated or received a call in the IMS. The call status of the user in the IMS is thus active. Unlike the process in FIG. 4, the process in FIG. 5 does not include the notification or publication of the change of the call status when the call status of the user in the IMS is changed to be active. The GMSC in the CS domain and the S-CSCF perform routing decision query in different ways, for the GMSC, the query is performed by the RPDP intercepting the routing information query request sent by the GMSC to the HLR, while the RPDP functions as an STP. And for the S-CSCF, the query is performed by triggering a terminating service in the IMS while the RPDP functions as an AS. In the instant-querying method, the two logic entities of the RPDP respectively in the CS domain and the IMS may perform independent querying without synchronization of the call status information via the internal or external interface.

The RPDP interacts with the HLR/HSS to query the register statuses of the user in the CS domain and the IMS. If the user has registered in both the CS domain and the IMS, the RPDP queries the UE for the call status(es) of the user via the scheme adopting SIP "one-off" subscription-and-notification mechanism or the scheme adopting USSD/SMS based querying mechanism. Based oil the result of the query (provided the call status of the user is active in the IMS), the RDPD determines that the domain via which the incoming call is to be delivered should be the IMS and returns a corresponding instruction and routing information to the GMSC/S-CSCF.

The GMSC/S-CSCF delivers the incoming call via the IMS according to the instruction and routing information received. If the new incoming call is determined to be refused during the subsequent handling process in the IMS, the GMSC/S-CSCF returns a call refuse message to the caller to terminate the handling process of the incoming call.

Subsequently, the user releases the previous call (Call 1) in the IMS, and the call status of the user in the IMS turns to be idle. Unlike the processes shown in the Figures described above, the call status change event is not notified or published.

It should be noted that in this embodiment the RPDP queries the UE for the call status(es). However, the RPDP may query another aware network entity, e.g., a Presence server or another gsmSCF or AS monitoring the entire handling process of the call in any one or both of the CS domain and the IMS.

Figure 6:
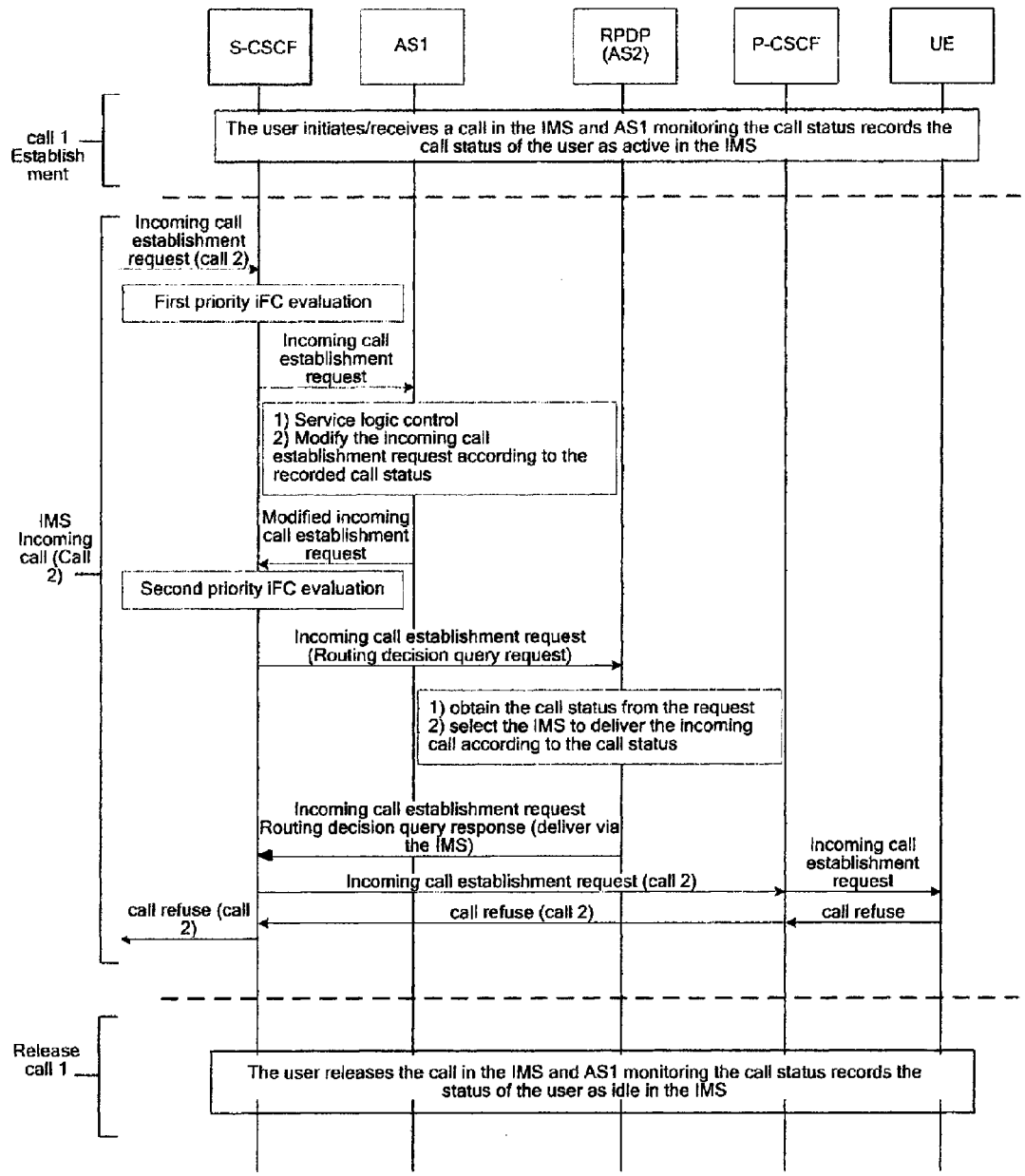
FIG. 6 is a message flow of a method of domain selection according to an embodiment of the present invention in which the call status(es) of the user is obtained by means of modified message transmission.

The method of domain selection shown in FIG. 6 is described hereafter, in which the aware network entity modifies the incoming call establishment request and keeps on transferring the modified incoming call establishment request. The RPDP obtains the call status(es) of the user from the modified incoming call establishment request.

The method shown in FIG. 6 differs from the embodiments in the foregoing description in the block of the obtaining of the call status(es). In addition, the method shown in FIG. 6 is only applicable to the first mode in the IMS. The subsequent handling process of the call shown in FIG. 6 is similar to the IMS processes shown in FIGS. 2, 3 and 5.

As shown in FIG. 6, before the S-CSCF receives an incoming call establishment request, the user has already initiated or received a call in the IMS. The call status information stored in an AS monitoring the call status of the user shows the call status(es) of the user is active in the IMS. Unlike the embodiment shown in FIG. 4, the AS which functions as the aware network entity does not notify the RPDP of the call status change event or publish the call status change event to the RPDP, and the RPDP does not store the call status information of the user.

In the existing IMS, the S-CSCF triggers service requests to corresponding ASs in order according to the iFCs arranged with priorities in the user profile. In this embodiment, concerning the incoming call establishment request received by the S-CSCF, the priority level of the iFC corresponding to the AS monitoring the call status(es) is higher than that corresponding to the AS that functions as the RPDP. Therefore, the incoming call establishment request is transferred by the S-CSCF to the AS monitoring the call status(es) firstly. After completing the service logic process, the AS monitoring the call status(es) modifies the incoming call establishment request according to the call status information of the user and then transfers the modified incoming call establishment request to the S-CSCF for further process.

Because the SIP is well extendable, the modification of the incoming call establishment request may be implemented by adding or modifying a specific existing SIP header field or extension of existing SIP header field, e.g., a Location header field defined by draft-ietf-sip-location-conveyance. The modification of the incoming call establishment request may also be implemented by adding a newly-defined SIP header field, or by inserting corresponding information into the body of the SIP message.

Therefore, when the S-CSCF transfers the modified incoming call establishment request to the AS that functions as the RPDP to query the routing decision according to the match of the iFC with a lower priority level, unlike the embodiment shown in FIG. 5, the RPDP does not query the aware network entity for the call status(es), but directly obtains the call status(es) from the modified incoming call establishment request which is taken as the routing decision query request. According to the call status(es) obtained, e.g., active in the IMS, the RPDP makes the routing decision that the IMS should be selected for delivering the incoming call, and returns corresponding instruction and routing information to the S-CSCF.

The S-CSCF delivers the incoming call via the IMS according to the instruction and routing information received. If the incoming call is determined to be refused during the subsequent handling process in the IMS, the S-CSCF returns a call refuse message to the caller to terminate the handling process of the incoming call.

Subsequently, the user releases the previous call (Call 1) in the IMS and the status of the user in the IMS turns to be idle. Unlike the embodiment shown in FIG. 4, the AS monitoring the call status(es) and functions as the aware network entity does not notify the RPDP of the call status change event or publish the call status change event to the RPDP.

All of the GSM, WCDMA CS domain, cdma2000 CS domain and PSTN provide CS services and can be referred to as CS networks. Similarly, the IMS defined by varieties of standardization organizations including 3GPP, 3GPP2 and TISPAN have basically consistent architectures. Therefore the IMS accessed via various fixed/mobile IPCAN defined by varieties of standardization organizations including 3GPP, 3GPP2 and TISPAN can be referred to as the IMS.

The foregoing description is only the preferred embodiments of the present invention and is not for use in limiting the protection scope thereof. All the modifications, equivalent replacements or improvements in the scope of the spirit and principles of the present invention should be included in the protection scope of the present invention.

What is claimed is:

1. A method of domain selection for routing an incoming call to a user via a Circuit Switched (CS) network or an IP Multimedia Subsystem (IMS) network, comprising:
   receiving, by a Routing Policy Decision Point (RPDP), a routing decision query request from a routing decision query entity which receives a request for establishing the incoming call;
   obtaining, by the RPDP, call status(es) of the user in any one or both of the CS network and the IMS network;
   selecting, by the RPDP, a domain between the CS network and the IMS network via which the incoming call is to be delivered to the user, according to the call status(es) of the user; and
   instructing the routing decision query entity to deliver the incoming call via the selected domain.

2. The method of claim 1, wherein a first mode adopting a call-control protocol based interface is used for the routing decision query, and the call status(es) of the user in any one or both of the CS network and the IMS network is(are) obtained by monitoring the call status(es) of the user and locally maintaining call status information of the user; and wherein the method further comprises:
   monitoring a status and a handling process of a relevant call of the user via the call-control protocol based interface; and
   updating the call status information of the user upon any one or any combination of establishing, connecting and releasing the relevant call.

3. The method of claim 1, wherein the obtaining the call status(es) of the user in any one or both of the CS network and the IMS network comprises:
   storing call status information of the user;
   receiving a message notifying a change of the call status(es) of the user from an aware network entity; and
   updating the call status(es) of the user according to the message received from the aware network entity.

4. The method of claim 3, wherein the receiving the message notifying the change of the call status(es) of the user from the aware network entity comprises:
   subscribing to the aware network entity for a call status relevant event through a Session Initial Protocol (SIP) SUBSCRIBE message, and negotiating a valid period of subscription with the aware network entity; and
   receiving through an SIP Notify message a call status change event notification from the aware network entity when the call status(es) of the user changes during the valid period of subscription.

5. The method of claim 3, wherein the message received from the aware network entity is a call status change event publication published by the aware network entity through an SIP PUBLISH message when the call status(es) of the user changes.

6. The method of claim 3, wherein the receiving the message notifying the change of the call status(es) of the user from the aware network entity comprises:
   subscribing to the aware network entity for a call status relevant event through an Unstructured Supplementary Service Data (USSD) or a Short Message Service (SMS) message; and
   receiving through another USSD/SMS message a call status change event notification from the aware network entity.

7. The method of claim 3, wherein the message received from the aware network entity notifying the change of the call status(es) of the user is call status change event publication published by the aware network entity through an USSD/SMS message when the call status(es) of the user changes.

8. The method of claim 1, wherein the obtaining the call status(es) of the user in any one or both of the CS network and the IMS network comprises:
   querying an aware network entity for the call status(es) of the user in any one or both of the CS network and the IMS network; and
   receiving the call status(es) of the user in any one or both of the CS network and the IMS network from the aware network entity.

9. The method of claim 1, further comprising:
   before obtaining the call status(es) of the user in any one or both of the CS network and the IMS network, modifying, by an Application Server (AS) acting as an aware network entity, an incoming call establishment request according to call status information locally maintained, and transferring the modified incoming call establishment request;
   wherein the obtaining the call status(es) of the user in any one or both of the CS network and the IMS network comprises:
   obtaining the call status(es) of the user in any one or both of the CS network and the IMS network from the modified incoming call establishment request.

10. The method of claim 3, wherein the call status(es) of the user are obtained from the aware network entity through an internal interface.

11. The method of claim 8, wherein the call status(es) of the user are obtained from the aware network entity through an internal interface.

12. The method of claim 1, wherein the call status(es) of the user in any one or both of the CS network and the IMS network is obtained by two independent logic entities respectively in the CS network and the IMS network; and the method further comprises:

synchronizing call status information between the two independent logic entities.

13. The method of claim 12, wherein the synchronizing the call status information is performed through an internal interface if the two independent logic entities are located in the same physical entity; or if the two independent logic entities are located in different physical entities, the synchronizing the call status information is performed through signaling interaction using any one of: Session Initiation Protocol (SIP), Mobile network Enhanced Logic (CAMEL) Application Part (CAP), Wireless Intelligent Network (WIN) Protocol, Intelligent Network Application Protocol (INAP), Unstructured Supplementary Service Data (USSD) and Short Message Service (SMS).

14. The method of claim 12, wherein the synchronizing the call status information between the two independent logic entities comprises:

sending, by a first logic entity, a notification notifying a change of the call status information to a second logic entity; and updating, by the second logic entity, the call status information locally maintained according to the notification.

15. The method of claim 12, wherein the synchronizing the call status information between the two independent logic entities comprises:

querying, by a first logic entity, a second logic entity for the call status information of the user; and returning, by the second logic entity, the call status information of the user in response to the querying.

16. An apparatus for routing a call to a user via a Circuit Switched (CS) network or an IP Multimedia Subsystem (IMS) network, comprising:

a receiver, configured to receive a routing decision query request from a routing decision query entity which receives a request for establishing the incoming call;

a processor, configured to obtain call status(es) of the user in any one or both of the CS network and the IMS network, and select a domain between the CS network and the IMS network via which the incoming call is to be delivered to the user, according to the call status(es) of the user; and a transmitter, configured to transmit an instruction to the routing decision query entity to deliver the incoming call via the selected domain.

17. The apparatus of claim 16, wherein a call-control protocol based interface is used for routing decision query, and wherein the processor is further configured to monitor the call status (es) of the user and locally maintain call status information of the user;

monitor a status and a handling process of a relevant call of the user via the call-control protocol based interface, and update the call status information of the user upon any one or any combination of establishing, connecting and releasing the relevant call.

18. The apparatus of claim 16, wherein the processor is further configured to query the call status(es) of the user in any one or both of the CS network and the IMS network; and receive the call status(es) of the user in any one or both of the CS network and the IMS network.

19. The apparatus of claim 16, wherein the processor is further configured to obtain the call status(es) of the user in any one or both of the CS network and the IMS network from a modified incoming call establishment request.

\* \* \* \* \*